(12) United States Patent
Klein (10) Patent No.: US 8,103,916 B2
(45) Date of Patent: Jan. 24, 2012

(54) SCHEDULING OF CHECKS IN COMPUTING SYSTEMS

(75) Inventor: Udo Klein, Maximillansau (DE)

(73) Assignee: SAP AG, Walldorf (DE)

( * ) Notice: Subject to any disclaimer, the term of this patent is extended or adjusted under 35 U.S.C. 154(b) by 324 days.

(21) Appl. No.: 12/325,522

(22) Filed: Dec. 1, 2008

(65) Prior Publication Data

US 2010/0138699 A1 Jun. 3, 2010

(51) Int. Cl.
G06F 11/00 (2006.01)
G06F 11/34 (2006.01)
(52) U.S. Cl. .............................. 714/48; 714/55; 702/123
(58) Field of Classification Search .................... 714/48, 714/55; 702/123
See application file for complete search history.

(56) References Cited

U.S. PATENT DOCUMENTS

| | | | | |
|---|---|---|---|---|
| 4,998,208 | A * | 3/1991 | Buhrow et al. | 702/35 |
| 5,471,629 | A * | 11/1995 | Risch | 707/687 |
| 5,500,941 | A * | 3/1996 | Gil | 714/38.1 |
| 5,586,252 | A * | 12/1996 | Barnard et al. | 714/48 |
| 6,081,771 | A * | 6/2000 | Urabe | 702/185 |
| 6,370,656 | B1 * | 4/2002 | Olarig et al. | 714/23 |
| 6,493,836 | B2 * | 12/2002 | Olarig et al. | 714/42 |
| 6,782,496 | B2 * | 8/2004 | Fleming | 714/55 |
| 7,472,388 | B2 * | 12/2008 | Fukunari et al. | 718/100 |
| 7,596,731 | B1 * | 9/2009 | Sharma | 714/724 |
| 2002/0198983 | A1 * | 12/2002 | Ullmann et al. | 709/224 |
| 2004/0181712 | A1 * | 9/2004 | Taniguchi et al. | 714/47 |
| 2005/0081114 | A1 * | 4/2005 | Ackaret et al. | 714/42 |
| 2005/0166089 | A1 | 7/2005 | Ito et al. | |
| 2005/0246590 | A1 * | 11/2005 | Lancaster | 714/47 |
| 2006/0168473 | A1 * | 7/2006 | Sahoo et al. | 714/15 |
| 2007/0043536 | A1 | 2/2007 | Tonack et al. | |
| 2008/0275985 | A1 * | 11/2008 | Kundu | 709/224 |

OTHER PUBLICATIONS

"European Application Serial No. 09013911.4, Extended European Search Report mailed Apr. 14, 2010", 8 Pgs.

Okamura, Hiroyuki, et al., "Availability optimization in operational software system with aperiodic time-based software system rejuvenation scheme", *Software Reliability Engineering Workshops*, (Nov. 11, 2008), 1-6.

Zeng, Fancong, et al., "A Reinforcement-Learning Approach to Failure-Detection Scheduling", *QSIC '07. IEEE*, (Oct. 11, 2007), 161-170.

* cited by examiner

*Primary Examiner* — Joseph Schell (74) *Attorney, Agent, or Firm* — Schwegman, Lundberg & Woessner, P.A.

(57) ABSTRACT

In an example embodiment, a method is provided for scheduling a check to detect anomalies in a computing system. An average time between the anomalies that are detectable by the check is identified and additionally, a runtime of the check is identified. A frequency of the check is then calculated based on the average time between the anomalies and the runtime of the check, and execution of the check may be scheduled based on the calculated frequency.

18 Claims, 7 Drawing Sheets

SCHEDULING OF CHECKS IN COMPUTING SYSTEMS

FIELD

The present disclosure relates generally to anomaly detection. In an example embodiment, the disclosure relates to scheduling of checks in computing systems.

BACKGROUND

A variety of checks may be run on a computing system to detect various glitches. For example, checks may be run to detect program crashes. In a hosted system environment with a large number of computers, such checks are typically automated where they are executed on a regular basis. Once a check detects a glitch, an incident report can be generated and proper actions may be taken to correct the glitch.

Unfortunately, the culminated effect of running all the checks degrades system performance because running the checks consumes system resources. In an extreme example, a computing system can be occupied 100% running the checks and thereby not have any available processing capacity to handle other applications. On the other hand, no glitches are detected if checks are not scheduled to run at all, which results in the degradation of system integrity.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide various techniques for scheduling checks in computing systems. In an example, the scheduling may be based on minimizing costs associated with and without executing the checks. As explained in more detail below, the minimization of costs results in an optimal frequency that can be derived from an average time between detected anomalies and runtime of the checks. The checks may then be scheduled for execution based on this calculated, optimal frequency.

Figure 1:
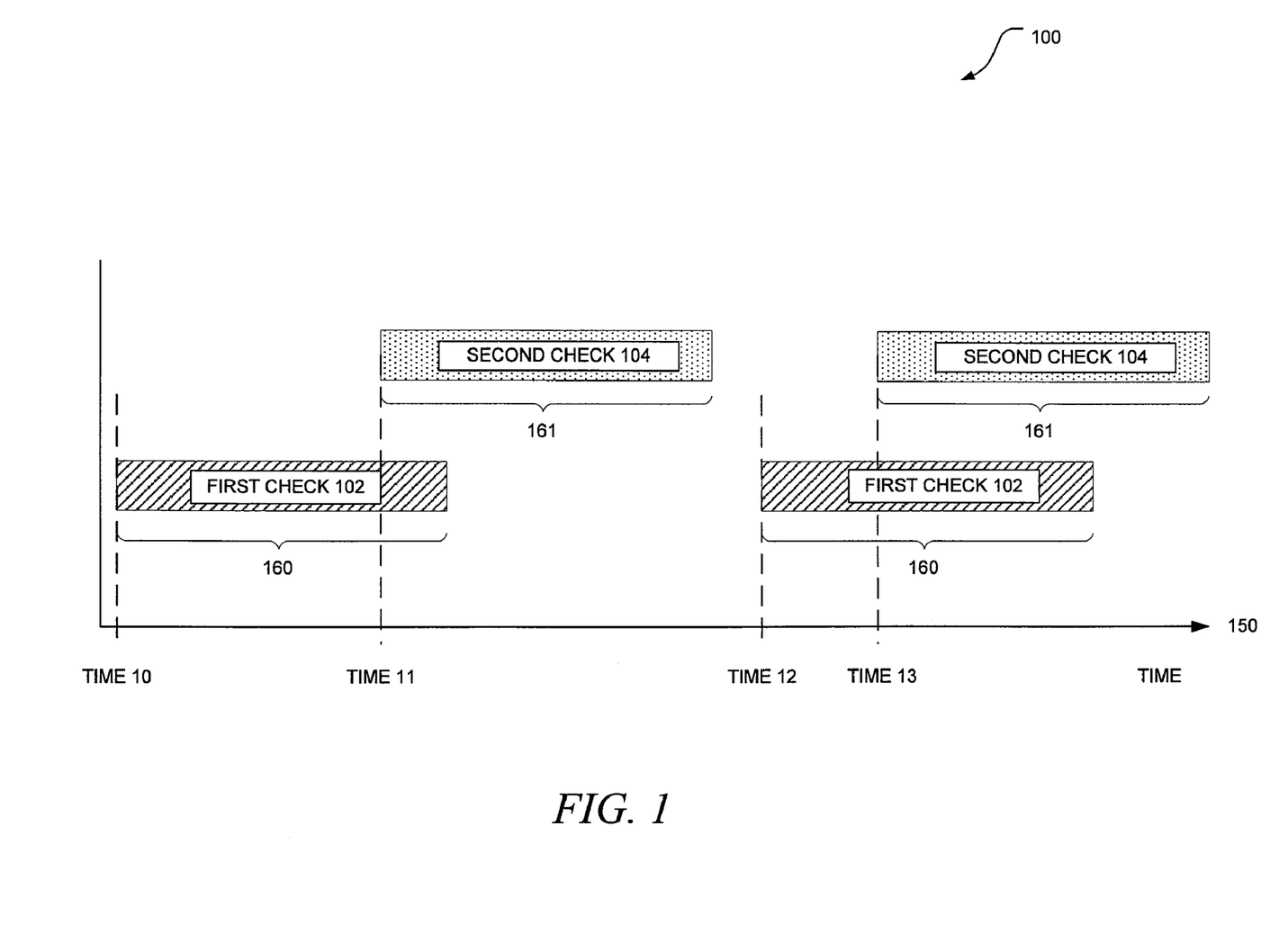
FIG. 1 depicts a diagram illustrating a scheduling of two checks, in accordance with an example embodiment, in a computing system.

FIG. 1 depicts a diagram illustrating a scheduling of two checks 102 and 104, in accordance with an example embodiment, in a computing system. The horizontal axis 150 defines time, which increases from left to right along the horizontal axis 150. In the example of FIG. 1, two different checks are scheduled, namely a "first" check 102 and a "second" check 104. A "check," as used herein, refers to a search, inquiry, or scan to detect one or more anomalies in a computing system. An "anomaly" refers to an undesirable state in a computing system, such as glitches and errors. Examples of particular anomalies include a presence of viruses, data inconsistencies, application crashes, buffer overflows, stuck messages, exceeding storage capacity, failed backups, input/output error, and other anomalies. The computing system that executes the checks includes a single or multiple processing systems that are configured to manipulate data according to a set of instructions.

Each check 102 or 104 is scheduled for execution at various times 10-13 for fixed periods of time 160 and 161. As used herein, a "runtime" of the check refers to a duration of the execution of a check, such as periods of time 160 and 161. As depicted in FIG. 1, the first check 102 is scheduled for execution starting at time 10 and scheduled again for execution starting at time 12 for the same runtime 160. Unlike the first check 102, the second check 104 is scheduled for execution starting at time 11 and scheduled again for execution starting at time 13 for the same duration 161.

The scheduling of the first checked 102 and the second check 104 relative to each other can be based on minimizing costs associated with and without executing the first check 102 and the second check 104. The cost of executing one or more checks refers to a price paid to execute the checks, which may be defined as a monetary cost, energy consumed, processor cycles, and other costs. On the other hand, the cost of not executing one or more checks refers to a price paid of not having to execute the checks, which effectively is the cost of not detecting the anomalies. As a result, the "cost of not executing a check" and the "cost of not detecting anomalies," as used herein, may be used interchangeably. For example, the cost of not detecting anomalies may include monetary cost spent to track, analyze, and fix the anomalies. In another example, the cost of not detecting the anomalies may include business lost as a result of the anomalies. It should be appreciated that in many examples, the cost of not detecting the anomalies cannot be automatically identified or detected by a computing system, but may instead be identified and provided by a user. As will be explained in more detail below, the first check 102 and the second check 104 may be scheduled relative to each other based on an optimal frequency that minimizes the both costs associated with and without executing the first and second checks 102 and 104.

Figure 2:
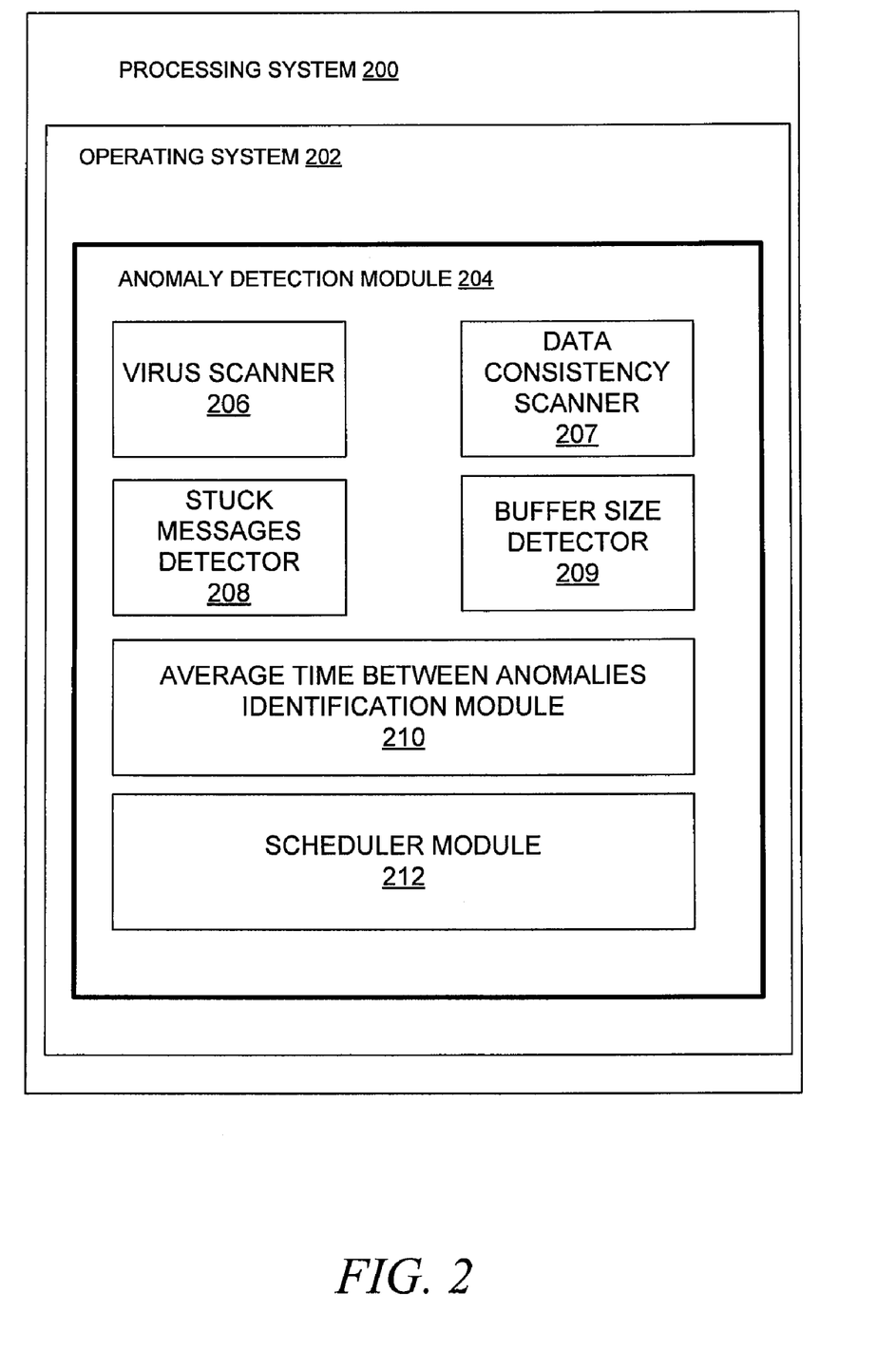
FIG. 2 depicts a block diagram of an anomaly detection module, in accordance with an embodiment, included in a processing system that is configured to schedule checks.

FIG. 2 depicts a block diagram of an anomaly detection module 204, in accordance with an embodiment, included in a processing system 200 that is configured to schedule checks. It should be appreciated that the processing system 200 may be deployed in the form of a variety of computing devices, such as personal computers, laptop computers, server computers, setup boxes, mobile phones, personal digital assistants, and other computing devices. As an example, the processing system 200 may form a part of an enterprise information system that provides server-side business functionalities, by way of a network, to multiple clients. In various embodiments, the processing system 200 may be used to implement computer programs, logic, applications, methods, processes, or software to schedule the execution of checks, as described in more detail below.

As depicted in FIG. 2, the processing system 200 hosts an operating system 202 that manages the software processes and/or services executing on the processing system 200. The software processes and/or services may include an anomaly detection module 204 that is configured to detect anomalies. As an example, the anomaly detection module 204 may be a type of health check application or service included in an enterprise information system that detects anomalies. The anomaly detection module 204 may, for example, help users to quickly identify and remedy any anomalies throughout, for example, the enterprise information system to improve overall application functioning.

The anomaly detection module 204 includes a variety of anomaly scanners or detectors that are configured to detect different anomalies. In the example of FIG. 2, the anomaly detection module 204 includes a virus scanner 206, a data consistency scanner 207, a stuck messages detector 208, and a buffer size detector 209. The virus scanner 206 scans for viruses, the data consistency scanner 207 scans for data inconsistencies, stuck messages detector 208 detects stuck messages, and the buffer size detector 209 detects buffer overflows.

Additionally, the anomaly detection module 204 includes an average time between anomalies identification module 210, which, as explained in more detail below, is configured to identify an average time between anomalies of each scanner or detector 206, 207, 208, or 209. Furthermore, the anomaly detection module 204 includes a scheduler module 212 that is configured to schedule execution of checks based on a calculated optimal frequency, which is based on the average time between anomalies. As an example, the scheduler module 212 can calculate an optimal frequency to schedule execution of the virus scanner 206 such that it checks for likely or popular viruses more often if short on runtime. With a longer runtime available, the scheduler module 212 may instead schedule the execution of the virus scanner 206 with less frequency.

It should be appreciated that in other embodiments, the processing system 200 may include fewer, more, or different modules apart from those shown in FIG. 2. For example, in an embodiment, the anomaly detection module 204 may not include the average time between anomalies identification module 210 because average times can be predefined. In another embodiment, the scheduler module 212 may be integrated with or included in, for example, the virus scanner 206 to schedule virus scans.

Figure 3:
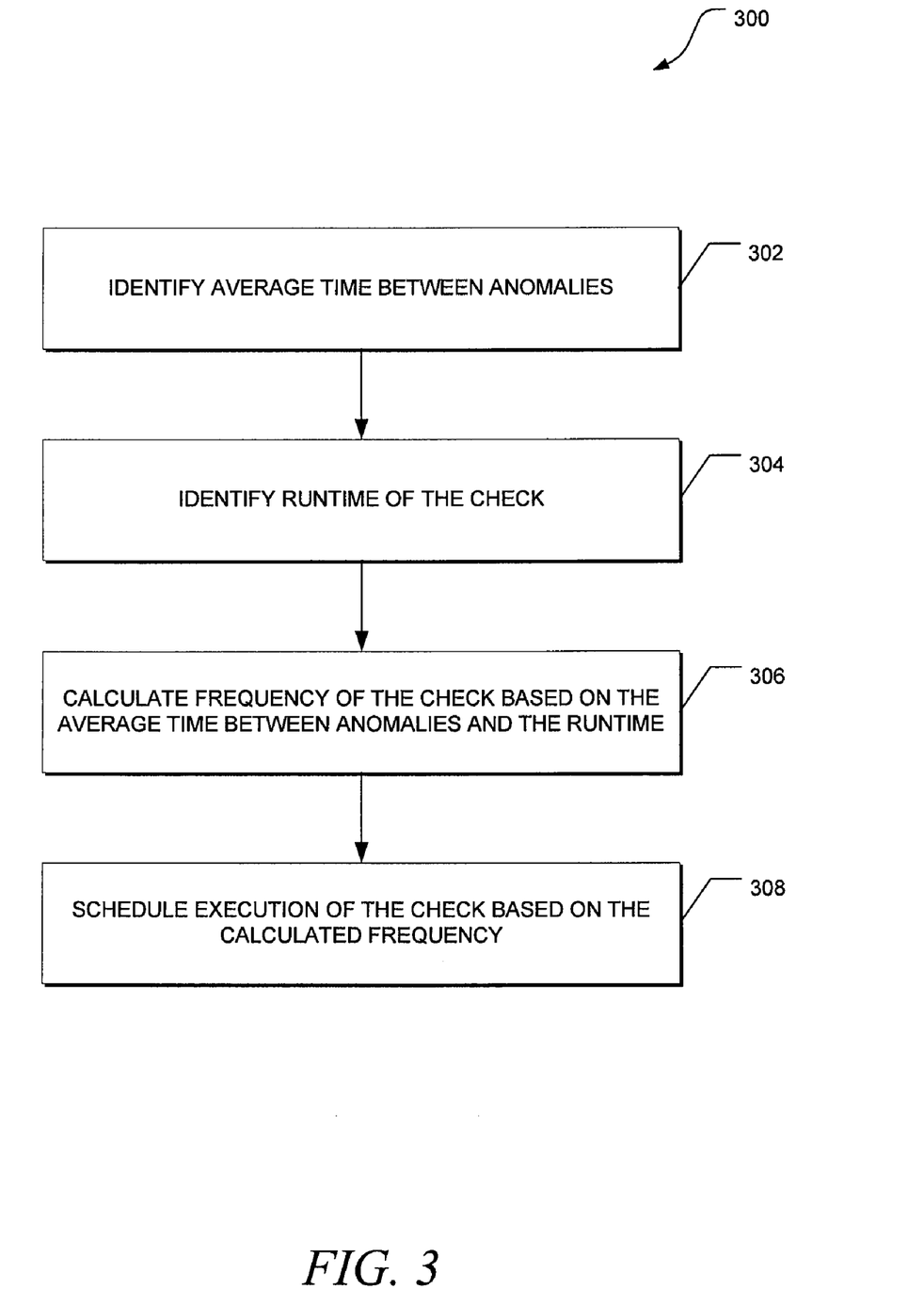
FIG. 3 depicts a flow diagram of a general overview of a method, in accordance with an embodiment, for scheduling one or more checks to detect anomalies in a computing system.

FIG. 3 depicts a flow diagram of a general overview of a method 300, in accordance with an embodiment, for scheduling one or more checks to detect anomalies in a computing system. In an embodiment, the method 300 may be implemented by the anomaly detection module 204 and employed in the processing system 200 depicted in FIG. 2. As depicted in FIG. 3, an average time between anomalies that are detectable by a check is identified at 302. The average time between anomalies refers to an arithmetic mean based on a runtime divided by a sum of a total number of anomalies detected within this runtime. In an embodiment, this average time may be calculated, which is explained in more detail below, or, in another embodiment, may be predefined. The runtime of the check is also identified at 304.

A frequency of the check can thereafter be calculated based on the average time between anomalies and the runtime of the check at 306. In general, this frequency is proportional to the average time and the runtime, which may be expressed as:

$$f = c\sqrt{\frac{M}{T}} \qquad 1.0$$

where the frequency f (e.g., in Hertz) is a square root of the average time between anomalies M (e.g., in seconds) divided by the runtime T (e.g., in CPU seconds). As explained in more detail below, the frequency may further be based on a cost of not executing the check. The check may then be scheduled for execution based on the calculated frequency at 308.

Figure 4:
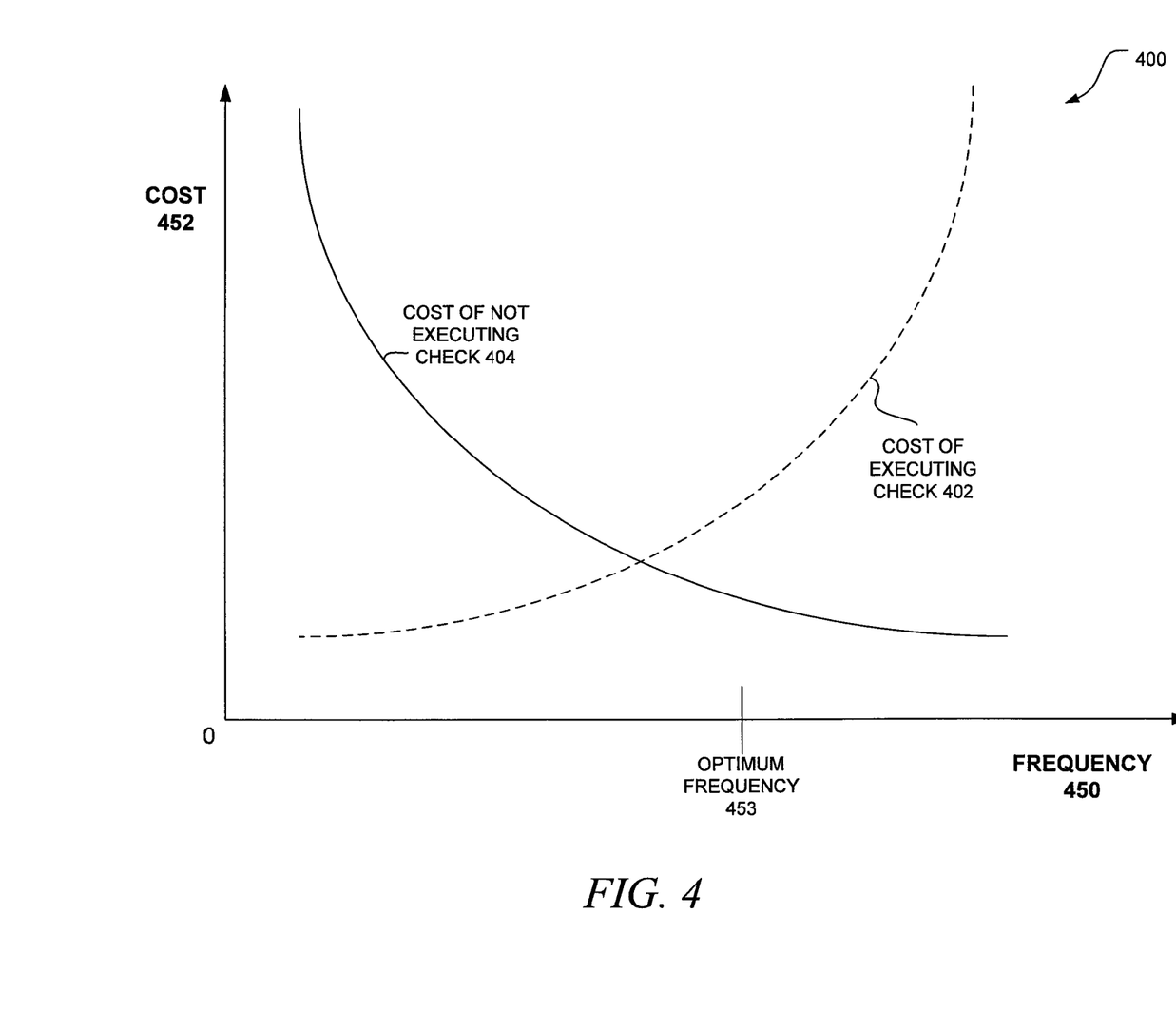
FIG. 4 depicts a plot of cost distributions, in accordance with an embodiment, illustrating the costs of executing and not executing a check.

FIG. 4 depicts a plot 400 of cost distributions, in accordance with an embodiment, illustrating the costs of executing and not executing a check. The horizontal axis 450 defines frequencies of the check, which increase from left to right, while the vertical axis 452 defines costs of the check, which increase from bottom to top. The frequency, as expressed in Equation 1.0 above, is based on a cost of executing the check 402 and a cost of not executing the check 404. Depending on the frequency, the costs 402 and 404 are directed in different directions.

The cost of not executing the check 404 may exponentially increase with the passing of time because, for example, the number of anomalies rises linearly with time between two checks, and the average time that the anomalies will persist also increases linearly. As depicted in FIG. 4, the cost of not executing the check 404 may therefore become exponentially more expensive as the frequency of the check decreases because more anomalies are not detected and therefore incur, for example, more cost to analyze and to fix the anomalies.

On the other hand, as depicted in FIG. 4, the cost of executing the check 402 may increase exponentially with the frequency because the cost of executing the check 402 can be inversely proportional to the time between two checks. That is, the cost of executing a check 402 can become exponentially more expensive as the frequency of the check increases because, for example, more processor cycles are needed.

An optimum frequency 453 that minimizes both costs 402 and 404 can be derived from the plots of the cost of executing the check 402 and the cost of not executing the check 404. In particular, this frequency 453 is derived from an average cost that is based a sum of the cost of executing the check 402 and the cost of not executing the check 404, which can be expressed as:

$$A \approx f*T + \frac{e*M}{2f} \qquad 2.0$$

where the average cost A is approximately equal to the frequency of executing the check f multiplied by the runtime T added to a cost of not executing the check e multiplied by the average time between anomalies M divided by the frequency f. In actuality, the f*T, as expressed in Equation 2.0, is actually the cost of executing the check 402 while the e*M/2f is the cost of not executing the check 404.

In order to find the optimum frequency 453 that minimizes costs 402 and 404, a Lagrange multiplier may be applied to Equation 2.0 above to yield a frequency that is expressed as:

$$f = \sqrt{\frac{e * M}{2T}} \qquad 3.0$$

where, similar to Equation 1.0 above, the frequency f is proportional to a square root of the cost of not executing the check e multiplied by the average time between anomalies M divided by the runtime T. As an example, if an anomaly occurs at a rate of 20 anomalies per day, then the execution of the check twice a day will catch 10 errors on average. Thus, if the check is executed four times a day, five anomalies will be detected per execution of the check, which means that if the runtime of the check is doubled, the expected anomalies detected are halved in the computing system. That is, Equation 2.0 and 3.0 essentially convey that a check should be executed often if this check detects many anomalies and is cheap to execute.

Figure 5:
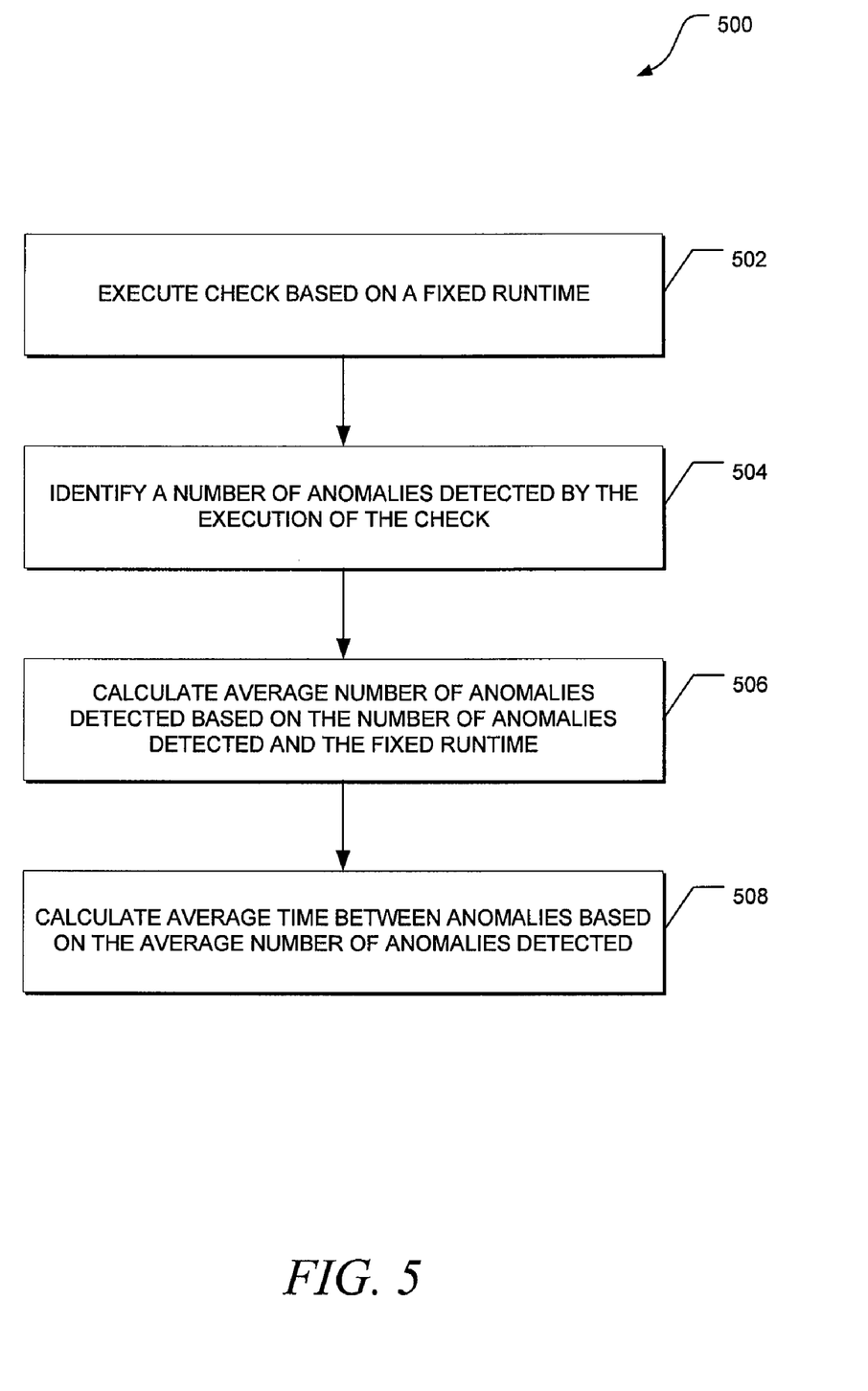
FIG. 5 depicts a flow diagram of a general overview of a method, in accordance with an embodiment, for identifying an average time between anomalies.

FIG. 5 depicts a flow diagram of a general overview of a method 500, in accordance with an embodiment, for identifying an average time between anomalies. In an embodiment, the method 500 may be implemented by the average time between anomalies identification module 210 and employed in the processing system 200 depicted in FIG. 2. As depicted in FIG. 5, to identify the average time between anomalies, a check may be executed based on a fixed runtime at 502, which may be predefined. A number of anomalies detected by the execution of the check are then identified at 504 by, for example, recording the number of anomalies detected within the fixed runtime.

In an embodiment, the average number of anomalies detected may then be calculated at 506 based on the number of anomalies detected and the fixed runtime, which may be expressed as:

$$AN = \frac{N}{R} \qquad 4.0$$

where the average number of anomalies AN is the number of anomalies detected N divided by the fixed runtime R. Of course, the average time between anomalies, which is calculated at 508, is the inverse of Equation 4.0. For example, an execution of a check may detect four anomalies within a fixed runtime of an hour. The average time between anomalies is therefore 60 minutes/four anomalies, which equals 15 minutes per anomaly.

Figure 6:
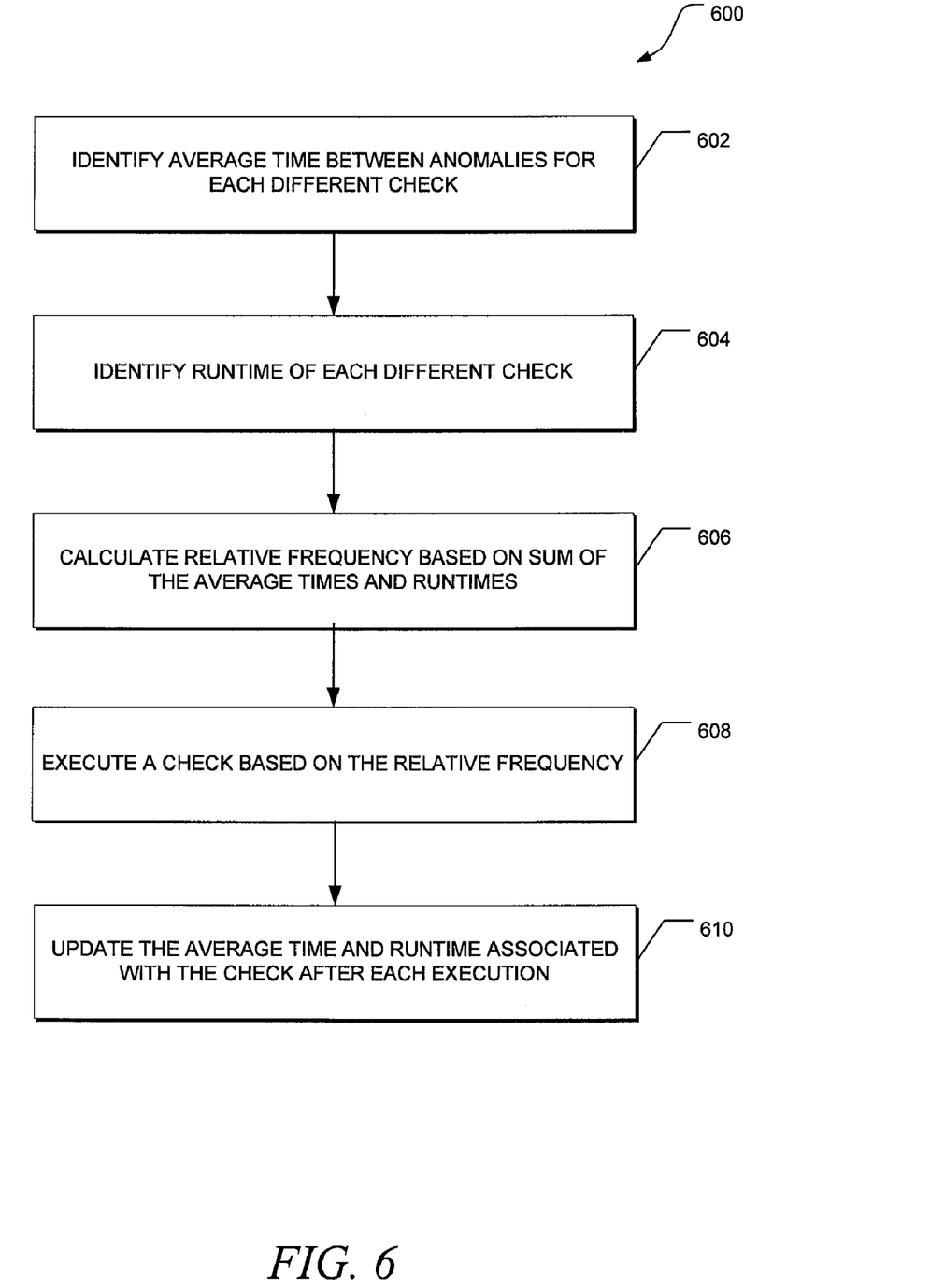
FIG. 6 depicts a flow diagram of a detailed method, in accordance with an embodiment, for scheduling multiple checks to detect various different anomalies in a computing system.

FIG. 6 depicts a flow diagram of a detailed method 600, in accordance with an embodiment, for scheduling multiple checks to detect various different anomalies in a computing system. In this example, multiple checks may be executed with each check configured to detect a different anomaly. The average time between anomalies for each check is identified at 602 and in addition, the runtime of each check is also identified at 604.

In general, the frequency of a single check can be calculated at 606 based on a sum of a proportion of the average times and runtimes of the different checks, which may be expressed as:

$$f_j = c_j \sqrt{\frac{M_j}{T_j}} \qquad 5.0$$

where the frequency f for each check j is proportional to the cost correction factor c multiplied by the square root of the average time between anomalies M divided by the runtime T. Similar to Equation 2.0 above, the frequency is derived from a sum of average costs associated with the checks, which are based on costs associated with and without executing the checks, and the application of the Lagrange multiplier. The cost correction factor c depends on the costs of not executing the checks, which may be expressed as:

$$c = \frac{\lambda}{\sqrt{\lambda + \lambda}} \left( \sum_j \sqrt{\frac{e_j M_j}{2T_j}} \right) \qquad 6.0$$

where the λ is expressed as:

$$\lambda = \left( \frac{\lambda}{c} \sum_j \sqrt{\frac{e_j M_j}{2T_j}} \right) \qquad 7.0$$

The correction factor c as expressed in Equation 6.0 may be defined manually, but could also be automatically decreased once the computing system becomes more stable depending on the criticalities of the abnormalities.

It should be appreciated that if the cost of not executing a check e is not known for every check, then such cost may be set to an equal value for all checks. In such an example, the frequency becomes a relative frequency. That is, the frequency defined in Equation 5.0 is a frequency of a single check relative to other frequencies of other checks. For example, the relative frequency can specify how a check may be executed twice as often as another check. It should be noted that the cost of not executing the check e for certain types of checks, such as severe or critical abnormalities, may also be allowed to automatically increase as the computing system becomes more stable.

The average time between anomalies M for each check j may be initially set equally for all checks but, in an alternative embodiment, may then be adjusted accordingly to observable errors. For example, as depicted in FIG. 6, a check may then be executed at 608 based on the calculated frequency (or relative frequency). At the end of execution, a number of anomalies detected by the check and the runtime of the check are identified. The average time between anomalies and the runtime may then be updated at 610 based on these newly identified values. The frequency of the check may then be recalculated based on the updated average time between the anomalies and the updated runtime.

Figure 7:
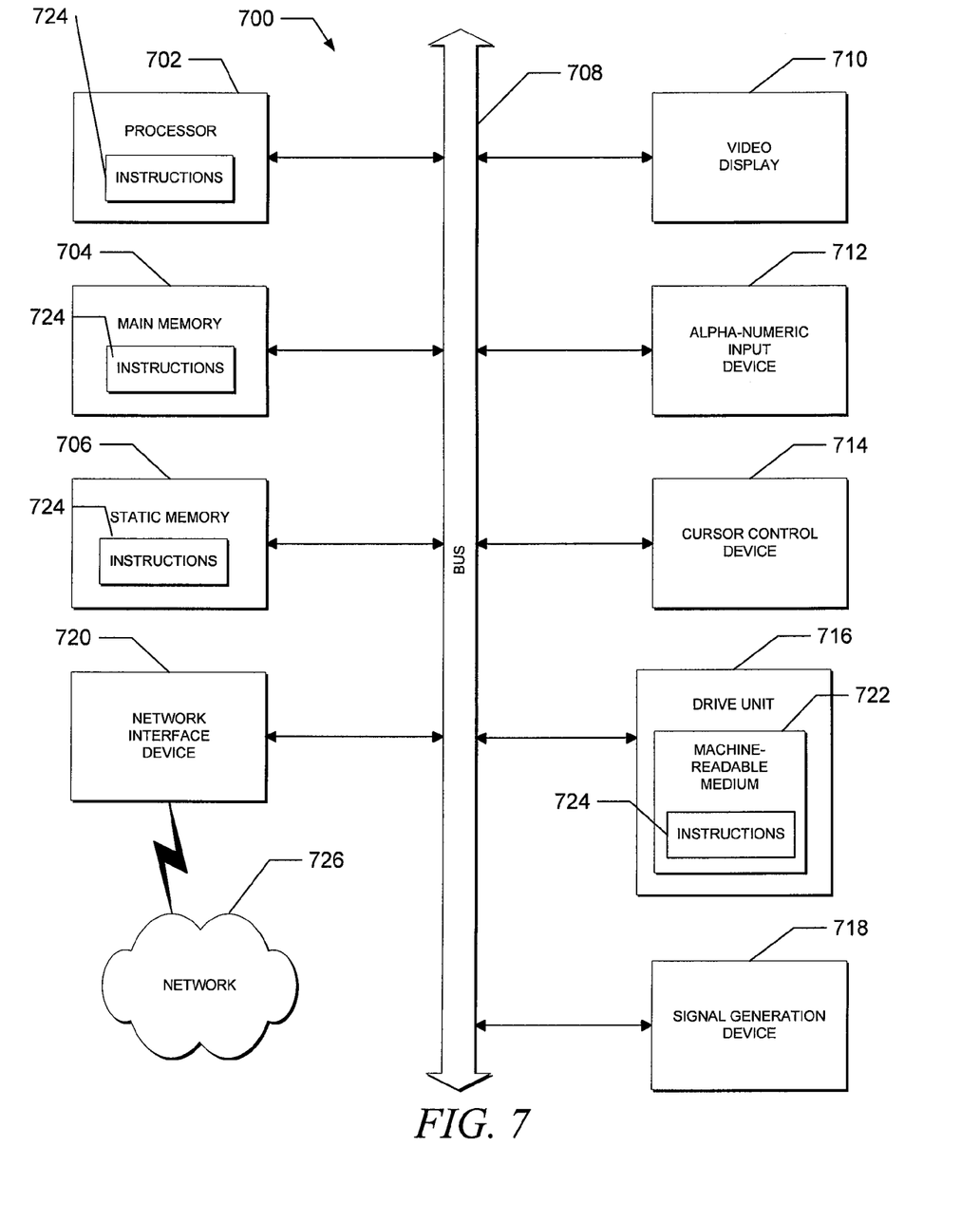
FIG. 7 is a block diagram of a machine in the example form of a processing system within which a set of instructions, for causing the machine to perform any one or more of the methodologies discussed herein, may be executed.

FIG. 7 is a block diagram of a machine in the example form of a processing system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In a networked deployment, the machine may operate in the capacity of a server or a client machine in server-client network environment, or as a peer machine in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example processing system 700 includes processor 702 (e.g., a central processing unit (CPU), a graphics processing unit (GPU) or both), main memory 704 and static memory 706, which communicate with each other via bus 708. The processing system 700 may further include video display unit 710 (e.g., a plasma display, a liquid crystal display (LCD) or a cathode ray tube (CRT)). The processing system 700 also includes alphanumeric input device 712 (e.g., a keyboard), user interface (UI) navigation device 714 (e.g., a mouse), disk drive unit 716, signal generation device 718 (e.g., a speaker), and network interface device 720.

The disk drive unit 716 includes machine-readable medium 722 on which is stored one or more sets of instructions and data structures (e.g., software 724) embodying or utilized by any one or more of the methodologies or functions described herein. The software 724 may also reside, completely or at least partially, within main memory 704 and/or within processor 702 during execution thereof by processing system 700, main memory 704 and processor 702 also constituting machine-readable, tangible media.

The software 724 may further be transmitted or received over network 726 via network interface device 720 utilizing any one of a number of well-known transfer protocols (e.g., HTTP).

While machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques check scheduling may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of scheduling a check to detect a plurality of anomalies in a computing system, the method comprising:
   identifying an average time between the plurality of anomalies that is detectable by the check;
   identifying a runtime of the check;
   calculating a frequency of the check based on the average time between the plurality of anomalies and the runtime of the check; and
   scheduling an execution of the check based on the frequency.

2. The method of claim 1, wherein the calculation of the frequency is further based on a cost of not detecting the plurality of anomalies by the check.

3. The method of claim 1, wherein the identifying of the average time between the plurality of anomalies comprises:
   executing the check based on a fixed runtime;
   identifying a number of the plurality of anomalies detected by the check within the fixed runtime; and
   calculating the average time between the plurality of anomalies based on the number of the plurality of anomalies detected and the fixed runtime.

4. The method of claim 1, further comprising:
   executing the check based on the scheduling;
   identifying a number of the plurality of anomalies detected by the execution of the check;
   identifying a further runtime of the execution of the check;
   updating the average time between the plurality of anomalies based on the identified number of the plurality of anomalies detected by the execution of the check;
   updating the runtime of the check based on the further runtime; and
   recalculating the frequency of the check based on the updated average time between the plurality of anomalies and the updated runtime.

5. The method of claim 1, wherein the frequency is proportional to a square root of the average time between the plurality of anomalies divided by the runtime.

6. The method of claim 1, wherein the plurality of anomalies is associated with one type of anomaly.

7. A machine-readable medium that stores instructions, which when performed by a machine, cause the machine to perform operations comprising:
   identifying a plurality of average times associated with a plurality of checks configured to detect a plurality of different types of anomalies, each average time being between a plurality of anomalies of each type of anomaly;
   identifying a plurality of runtimes of the plurality of checks;
   calculating a relative frequency of a single check in the plurality of checks based on a sum of a proportion of each average time in the plurality of average times and each runtime in the plurality of runtimes; and
   scheduling an execution of the single check based on the relative frequency.

8. The machine-readable medium of claim 7, wherein the relative frequency is based on a cost of executing the single check relative to a plurality of other checks in the plurality of checks and a cost of not executing the single check relative to the plurality of other checks.

9. The machine-readable medium of claim 7, wherein the relative frequency is a frequency of the single check relative to a plurality of other frequencies.

10. The machine-readable medium of claim 7, wherein a check in the plurality of checks is a virus scan.

11. The machine-readable medium of claim 7, wherein a check in the plurality of checks is a data consistency scan.

12. The machine-readable medium of claim 7, wherein the operation of identifying the plurality of average times comprises:
 executing a check in the plurality of checks based on a fixed runtime;
 identifying a number of the plurality of anomalies detected by the check within the fixed runtime;
 calculating an average number of the plurality of anomalies detected based on the number of the plurality of identified anomalies and the fixed runtime; and
 calculating an average time in the plurality of average times based on the average number of the plurality of anomalies detected.

13. A processing system comprising:
 at least one processor; and
 a memory in communication with the at least one processor, the memory being configured to store an anomaly detection module that is executable by the at least one processor, the anomaly detection module having instructions, that when executed by the at least one processor, cause operations to be performed, comprising:
  executing a check to detect a plurality of anomalies based on a fixed runtime;
  identifying a number of the plurality of anomalies detected by the check within the fixed runtime;
  calculating an average time between the plurality of anomalies based on the number of plurality of anomalies detected by the check within the fixed runtime;
  identifying a runtime of the check;
  identifying a cost of not detecting the plurality of anomalies by the check;
  calculating a frequency of the check based on the average time between the plurality of anomalies, the runtime of the check, and the cost of not detecting the plurality of anomalies; and
  scheduling an execution of the check based on the frequency.

14. The processing system of claim 13, wherein the check is configured to detect the plurality of anomalies in an enterprise information system.

15. The processing system of claim 13, wherein the cost of not detecting the plurality of anomalies includes a cost for tracking the plurality of anomalies.

16. The processing system of claim 13, wherein the cost of not detecting the plurality of anomalies includes cost for fixing the plurality of anomalies.

17. The processing system of claim 13, the frequency is proportional to the cost of not detecting the plurality of anomalies multiplied by a square root of the average time between the plurality of anomalies divided by the runtime.

18. The processing system of claim 13, wherein the instructions, that when executed by the at least one processor, cause further operations to be performed, comprising:
 executing the check based on the scheduling;
 identifying a further number of the plurality of anomalies detected by the execution of the check;
 identifying a further runtime of the execution of the check;
 updating the average time between the plurality of anomalies based on the further number of the plurality of anomalies detected by the execution of the check;
 updating the runtime of the check based on the further runtime; and
 recalculating the frequency of the check based on the updated average time between the plurality of anomalies and the updated runtime.

* * * * *